J. HAAG.
APPARATUS FOR REGULATING THE LIQUID LEVEL OF STEAM OR OTHER VAPOR GENERATORS.
APPLICATION FILED OCT. 20, 1921.
1,410,805.
Patented Mar. 28, 1922.
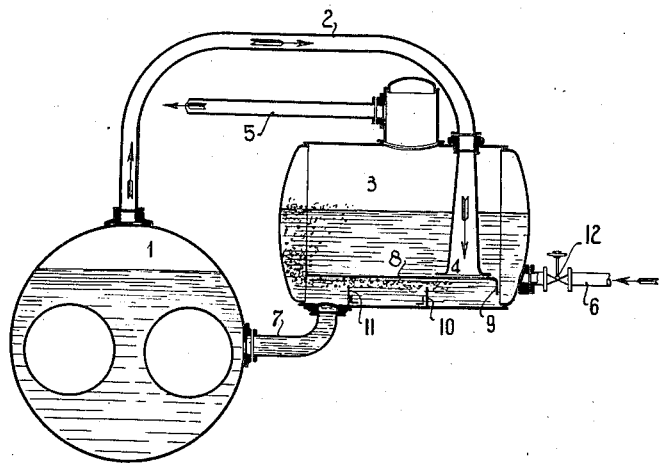
Inventor:
Jacobus Haag
By Lawrence Langner
Attorney

UNITED STATES PATENT OFFICE.

JACOBUS HAAG, OF AMSTERDAM, NETHERLANDS.

APPARATUS FOR REGULATING THE LIQUID LEVEL OF STEAM OR OTHER VAPOR GENERATORS.

1,410,805.  Specification of Letters Patent.  Patented Mar. 28, 1922.

Application filed October 20, 1921. Serial No. 509,162.

*To all whom it may concern:*

Be it known that I, JACOBUS HAAG, a subject of the Queen of the Netherlands, residing at Amsterdam, Netherlands, have invented certain new and useful Improvements in Apparatus for Regulating the Liquid Level of Steam or other Vapor Generators, of which the following is a specification.

The present invention has for its object to maintain at a constant level the liquid in a steam generator, or, in general, in a vapor generator, without valves, cocks, or similar mechanical controlling means being required, and in particular applies to steam boiler plants. In effect the invention relates to apparatus of the type including a reservoir the liquid space of which is connected both with the vapor space and with the liquid space of the vapor generator in which the liquid is to be maintained at a constant level, the duct which connects the reservoir with the vapor space of the generator opening into the reservoir on a level with the liquid level in the steam generator.

In the apparatus according to the invention the reservoir is provided with a vapor outlet and can thus be used as a preheater for preheating the liquid to the temperature of the vapor generator besides functioning as a liquid level regulator and accumulator—it being understood that it is not new in itself to connect to the water space and the vapor space of a steam generator a reservoir serving as an accumulator and preheater though not as a water level regulator.

In order that this invention may be more readily understood, reference is had to the accompanying illustrative drawing which represents a steam boiler plant according to this invention.

1 represents the boiler. The steam pipe 2, by which the steam generated in the boiler is conducted to the water reservoir 3 opens into the latter at 4; 5 is the steam outlet pipe, 6 the cold water feed pipe, and 7 the pipe by which the water flows automatically from the reservoir into the boiler. In the reservoir 3 there is provided a baffle 8 on a level with the outlet 4 and a downwardly extending baffle 9 at the side of said outlet. Due to said baffles the steam introduced by the pipe 2 is forced to flow through the water beneath the baffle 8 whereby the feed water is heated, whereupon at the end of the said baffle the steam rises to the surface of the water and escapes through pipe 5.

As long as the water level in the reservoir 3 is above the baffle 8, the water level in the boiler 1 is automatically kept at the level of the said baffle, irrespective of the water level in the reservoir and of the pressure in the boiler. This may be explained as follows:

In order that the steam from the pipe 2 can flow through the water against the water pressure in the reservoir, it must overcome the pressure of the steam and of the column of water in the reservoir above the baffle 8. The pressure in the steam space of the boiler must therefore be greater than the pressure in the steam space of the reservoir by an amount equal to the pressure of said column of water. This difference in pressure just suffices to prevent the water which flows from the reservoir into the boiler from rising in the boiler to a higher level than that of the baffle 8. This action is independent of the height of the said column of water. Consequently, as long as there is water above said baffle in the reservoir, the water level in the boiler will be constant. The water reservoir is arranged in such a manner with respect to the boiler that the baffle 8 is on a level with the desired water level in the boiler. It will thus be understood that the reservoir acts as an ordinary bottle of Mariotte.

In absence of the baffles 8 and 9 the steam would immediately after its egress from the opening 4 rise to the surface of the surrounding water and would have all the less opportunity to heat the water. But also in this case the water in the boiler would be on a level with the inlet 4 irrespective of the water level in the reservoir and of the pressure in the boiler, as long as the water level in the reservoir is above the inlet 4.

With respect to the operation of the apparatus as a feed water heater, it has been mentioned above that the steam heats the water while passing through the same. The steam entering the water by the pipe 2 is condensed in the reservoir until the water therein has acquired the temperature of the steam in the boiler. From this moment onward only so much steam is to be condensed as is required to heat the cold feed water entering the reservoir by pipe 6 which, in other systems, must be heated to the required temperature in the boiler itself, and the rest of the steam can be allowed to escape by the pipe 5 or can serve to increase the pressure and be allowed to partly condense in the boiler water. The feed water entering the boiler by pipe 7 is thus brought to the temperature of the water in the boiler. This does not reduce the steam production because, after the water in the reservoir has been brought to the required temperature and after heat has thus been accumulated therein (which heat, as will be shown, can again be utilized later) only so much steam will condense as is required to heat the feed water introduced by the pipe 6, which otherwise would have to be done in the boiler. The production of steam is thereby not only not reduced, but even increased. This can be explained as follows.

In the arrangement according to this invention the heating surface of the boiler is in its entirety in contact with boiling water; if, however, feed water of a lower temperature is introduced into the boiler, a portion of the heating surface comes into contact with water which has not yet attained the boiling-point. Non-boiling water, however, conducts the heat much worse than boiling water, from which fact follows that in an arrangement according to this invention the efficiency of the heating surface is increased and a greater quantity of steam is generated. In addition to the increased production of steam the circulation of the boiler water is enhanced which fact again favorably affects the production of steam. As shall be shown later, the production of steam is increased by still other causes.

From the fact that the feed water enters into the boiler with the same temperature as the water in the boiler, the further advantage is derived that detrimental strains which would be produced in the boiler plates when cooled by the feed water are entirely avoided.

The action as an accumulator is as follows.

In case the boiler generates more steam than is consumed by the steam engines or by the steam apparatuses, and the safety valve begins to blow off, the excess of steam may be allowed to condense by increasing the supply of feed water through further opening the valve 12, whereby the feed water is heated and the excess of the generated heat accumulated in the reservoir. Again, in the case of increasing load, a drop of the steam pressure may be avoided by reducing the supply of cold feed water to the reservoir or even cutting it off entirely. In this event, less steam is condensed and more steam escapes through the pipe 5. When the feed water supply is entirely shut off, the condensation of steam ceases completely. In case the load continues to increase, the water in the reservoir evaporates and the accumulated heat therein is utilized in the same manner as in known heat accumulators.

While in an ordinary steam boiler plant increased steam consumption necessitates the introduction of a larger quantity of cold feed water in order that the desired water level may be maintained, whereby that portion of the heating surface which is in contact with non-boiling water is increased and that portion in contact with boiling water, i. e. the surface on which the steam is directly generated is reduced (owing to which the drop in pressure is all the more favoured), this inconvenience is entirely eliminated in an arrangement according to this present invention. The water in the boiler is here automatically kept at the desired level, the heating surface is at all times in contact with boiling water and thus in its entirety used for the direct production of steam, while in case of increased consumption of steam the feed water supply may be reduced and temporarily even completely shut off, whereby less steam is condensed and more steam generated. The steam pressure, therefore, is not reduced or at least to a considerably lower degree than in an ordinary steam boiler plant wherein increased consumption of power necessitates a higher steam pressure.

The reservoir which serves as a water level regulator, as a feed water heater and as an accumulator can also be used for the purification of the feed water. By the provision of a baffle 10 at the bottom of the reservoir the mud is retained. In place of this baffle a pocket can be arranged wherein the mud can settle and accumulate. By the provision of a second baffle 11 in the path of the feed water and by the provision between the baffles 10 and 11 of a suitable material (for instance iron shavings) on which the scale can deposit, the sediment will collect in this space as the water has already attained the temperature of the boiler.

Owing to the fact that no scale or mud can deposit in the boiler, the transmission of heat and thereby the production of steam is increased and the steam space can be smaller because priming does not give rise to difficulties. The result is an increase of the heating surface and consequently of the steam generation. Furthermore, the absence of scale and mud means that overheating of the heating surface and consequent deformations (fractures and explosion) are entirely excluded. Priming in the reservoir can be prevented by the provision of baffles or screens in order to attain an even water level. These partitions can also be formed as a water separator. In this manner, the steam generated can be dryer than in an ordinary boiler.

The above mentioned circumstances whereby the production of steam is raised by an increase of heat transmission, viz. the permanent contact of boiling water with the entire heating surface, the elimination of scale and mud deposit on the heating surface as well as the improved circulation have the result that the combustion gases have a lower temperature when entering the stack. The fuel is thus better utilized, and in addition to an increased production of steam a saving of fuel is realized.

Moreover, the use of an apparatus according to this invention does not exclude the employment of a feed water heater in which the feed water is preheated by the flue gases.

The reservoir can be provided with the usual appliances such as water gauges, drain cocks etc. and can be constructed in such a manner that the interior can be cleaned and is easily accessible.

Evidently the reservoir 3 may also be arranged within or around the steam boiler.

Claims.

1. The combination with a vapor generator, of means for regulating the liquid level thereof, comprising a closed reservoir, a pipe connecting the reservoir with the vapor space of said generator, said pipe opening into said reservoir on a level with the liquid level in the generator, a pipe connecting the reservoir with the liquid space of the generator, a vapor outlet pipe connected to said reservoir, and a feed pipe connected to the apparatus.

2. The combination with a vapor generator, of means for regulating the liquid level thereof, comprising a closed reservoir, a pipe connecting the reservoir with the vapor space of said generator, said pipe opening into said reservoir on a level with the liquid level in the generator, a pipe connecting the reservoir with the liquid space of the generator, and a vapor outlet pipe and a feed pipe connected to said reservoir.

3. Apparatus as claimed in claim 1, further characterized in that the reservoir is provided with one or more screens or baffles for compelling the vapor to flow through the liquid.

4. Apparatus as claimed in claim 2, further characterized by a mud or scale collector arranged inside the reservoir.

In testimony whereof I affix my signature.

JACOBUS HAAG.

Witnesses:
H. V. KUYPEID,
TL. SHANGENDIJK.